UNITED STATES PATENT OFFICE.

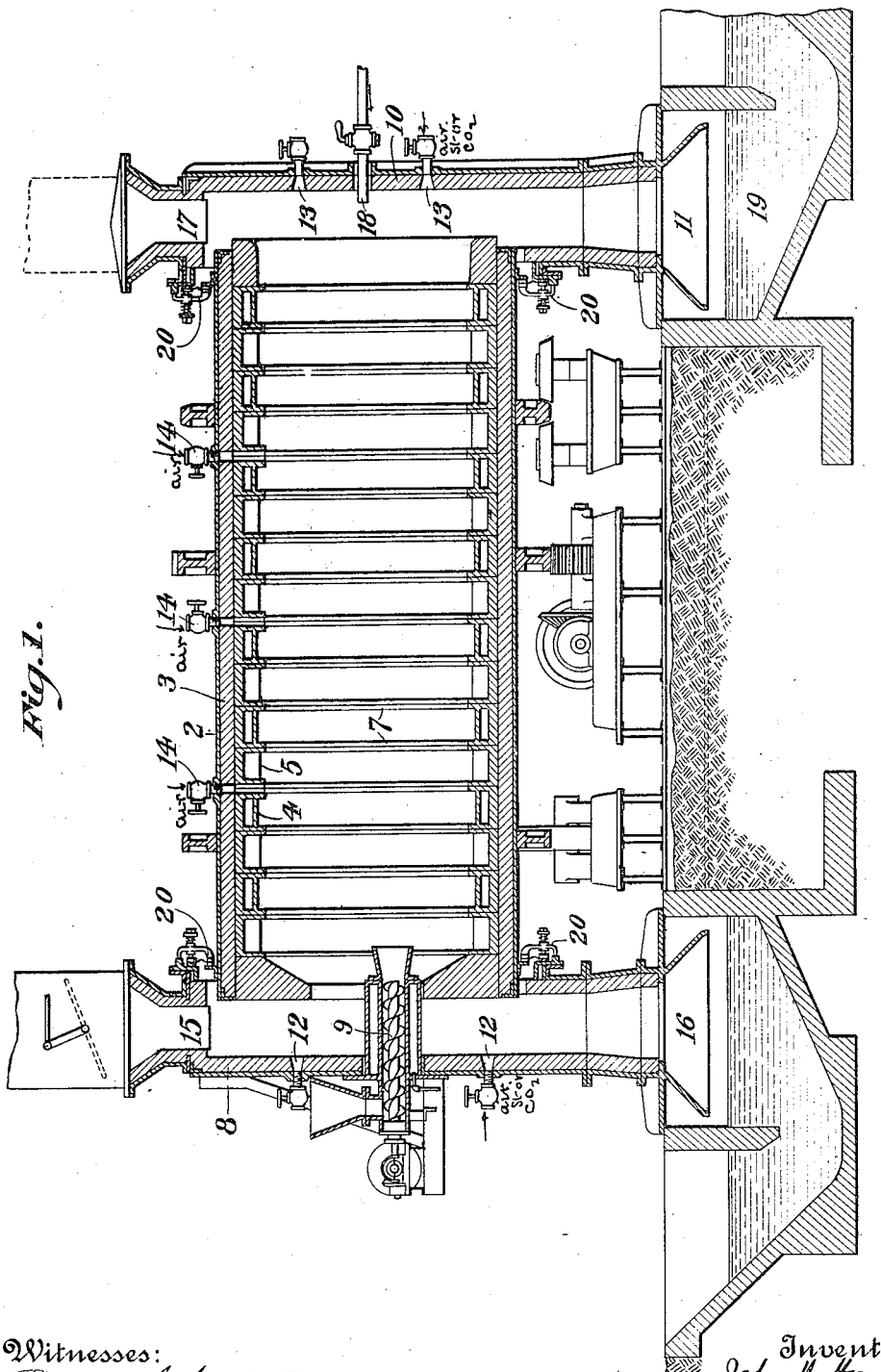

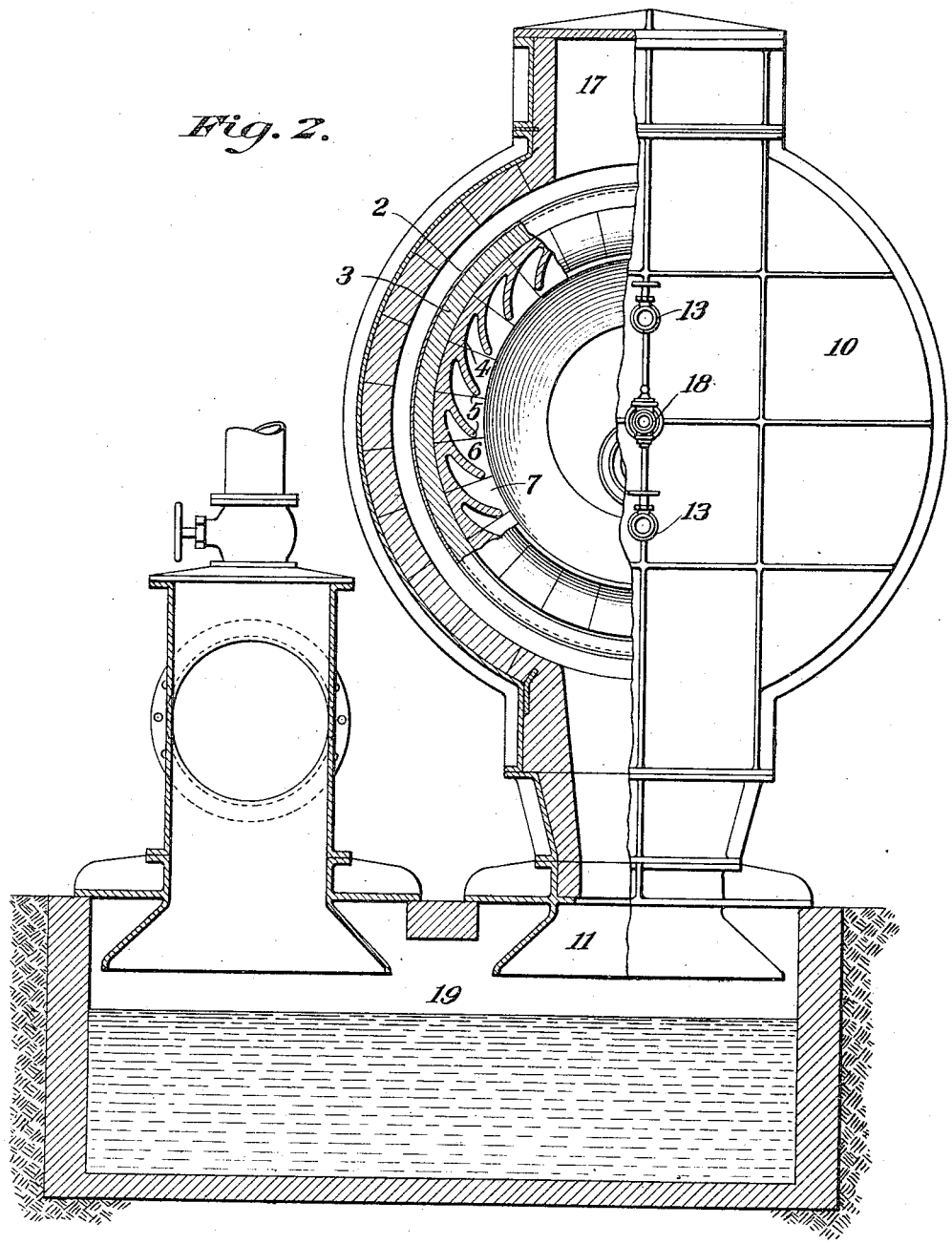

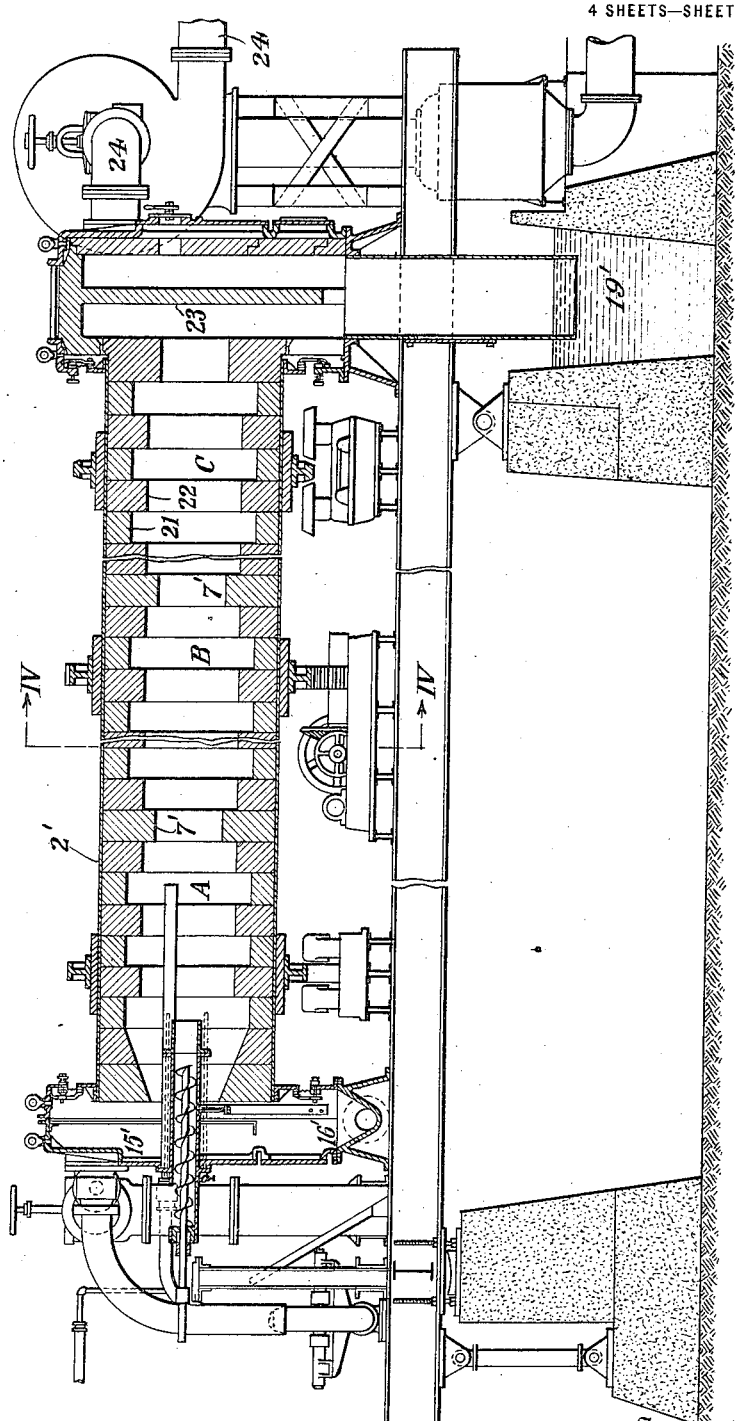

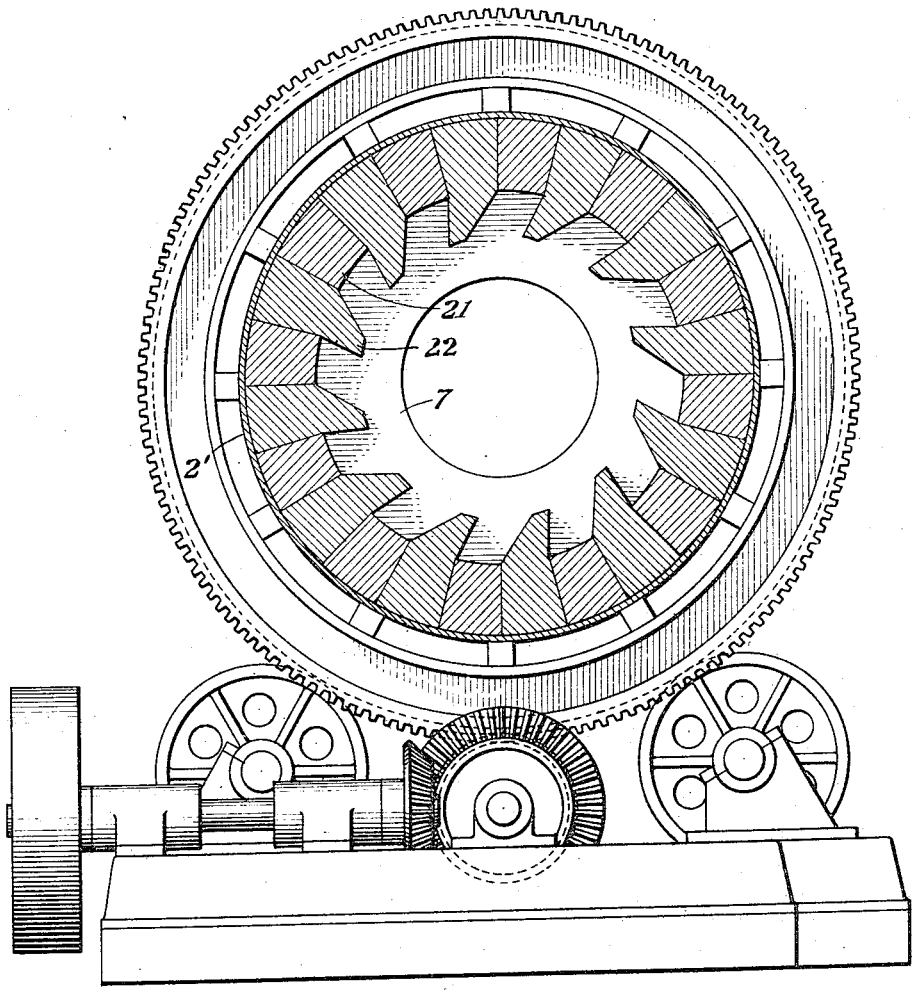

JOHN W. HORNSEY, OF SUMMIT, NEW JERSEY, ASSIGNOR TO GENERAL REDUCTION GAS AND BY-PRODUCTS COMPANY, A CORPORATION OF DELAWARE.

GAS-PRODUCER.

1,267,410.            Specification of Letters Patent.        Patented May 28, 1918.

Application filed July 3, 1914, Serial No. 848,704. Renewed August 17, 1917. Serial No. 186,825.

*To all whom it may concern:*

Be it known that I, JOHN W. HORNSEY, a citizen of the United States, and a resident of Summit, Union county, New Jersey, have invented new and useful Improvements in Gas-Producers, of which the following is a specification, reference being had to the accompanying drawings, in which—

Figure 1 is a section of a gas producer embodying my invention; Fig. 2 is an elevation, partly in section, thereof; Fig. 3 shows a section of a modified form of my device, and Fig. 4 is a section on lines IV—IV of Fig. 3.

My invention relates to gas producers and is comprised of apparatus adapted to be used continuously and in which the material treated will repeatedly be passed through a heated and agitated zone by means of a plurality of lifting blades or buckets, and by which the various particles of material are repeatedly lifted and separated from each other and are brought into contact with the heated gases in the heated zone in such fashion as to expose the greatest amount of surface to chemical reaction, which is thereby expedited and rendered more efficient. The apparatus which I shall hereinafter describe and claim is particularly suitable for use in carrying out the invention described and claimed in my co-pending application, Serial No. 653,522, filed October 9, 1911.

In my improved producer I am enabled to recover a much higher percentage of heat values than in apparatus heretofore used, and my producer is much simpler and more durable than those used in the prior processes. My producer is so constructed that I am enabled to continuously feed the material into it, to withdraw the ash continuously, to maintain temperatures therein which are most efficient in producing the desired reacting, and also to constantly supply and maintain the material to be treated in a state of constantly agitated sub-division, with the result that the gas produced is of a much more uniform quality than heretofore. Further objects of my invention are the utilization of finely divided fuel, the production of gas substantially free from tar, and in the construction and operation of apparatus which I shall hereinafter describe and claim.

Referring to the drawings, in which I have shown preferred types of apparatus illustrating my invention, 2 is a metal shell or casing adapted to be rotated by any well-known means, and preferably inclined from its feed end to its discharge end. The casing 2 has a refractory lining 3 and to this lining 3 are attached the buckets or lifting blades 4, adapted to elevate the material and drop it down across the casing 2 during the rotation thereof in a substantially uniformly distributed shower, the lips 5 of the buckets being so arranged that as they travel upward they will form pockets 6 for the material so that all of the material will not fall out of these pockets until each pocket has reached substantially the highest point in the casing. The sides of the pockets are preferably arranged in staggered relation, so that the material falling from one set of pockets will fall out of horizontal alinement with the material in the succeeding and preceding sets. The pockets are arranged between and separated by the transverse rings or ribs 7, which may, however, be made integral with the lifting blades 4.

At the feed end 8 of the casing is a conveyer 9 by which the material is admitted, and at the discharge end 10 is an off-take 11, from which the ash or waste material is discharged. In the ends 8 and 10 are openings 12 and 13, respectively, through which the oxygen-bearing agent, such as air, steam or carbon-dioxid, may be admitted into the interior of the vessel, and 14 are the inlet ports in the walls of the casing 2, through which, if desired, the oxygen-bearing or temperature-controlling agent, such as atmospheric air, may also be admitted to assist in the regulation of the reactions and temperatures. At the feed end 8 are the outlets 15 and 16, and at the discharge end are the outlet 17 and the offtake 11, various ones of which may be used as outlets for the gas, as desired. The burner 18 for oil or gas, may be used as a starting device. The numeral 19 indicates a settling basin, in which the ash or waste is deposited. To prevent the entrance or leakage of air or gas between the moving casing 2 and its stationary ends 8 and 10, I employ the flexible joints 20.

The conveyer 9 is so designed that it will always contain a sufficient quantity of material to prevent any leakage through the conveyer.

My apparatus is of the double-ended type and is capable of being used in carrying out my invention in a variety of ways, and I will now describe two typical examples of the ways in which it may utilized for making gas.

First. Introducing gas in which it is desired to recover by-products from the fuel, I first pre-heat the vessel by any suitable means, as by the burner 18, and when the interior of the vessel has reached the desired temperature I begin to revolve it and to feed a small quantity of coal or other carbonaceous material in through the conveyer 9. As this charge reaches the desired temperature I increase the feed of the material to the desired point and continue to revolve the cylinder, at the same time admitting air and, if desired, steam, through the openings 13 in sufficient quantities to promote partial combustion. The revolution of the casing causes the pockets 6 to fill up with the material as they pass downward into the mass and to spill it out or shower it in a thin stream across the inner diameter of the casing. Each pocket performs essentially the same operation, and as each set of pockets is staggered with relation to the adjacent sets, there ensues not only a series of these showers following each other with regard to any one set of buckets, but there is also a series of showers out of line with the showers on each side of it. As the cylinder is preferably inclined the material advances with each revolution of the vessel, so that it is showered again and again by the successive pockets down through the oxidizing agent on to the bottom of the casing, thus exposing the largest possible surface to the reacting elements, and the showering in connection with the tumbling action from the top and bottom of the casing effectively removes the surfaces of the particles which have become seared by the action of the heat, which otherwise would prevent or retard the desired reaction.

The gas begins to pass off from the material shortly after it is fed into the chamber, and can be led away either through the gas outlets 15 or 16, as desired. After the operation has proceeded far enough to insure the presence of a suitable amount of carbonaceous material in a more or less completely coked or distilled condition, having obtained the requisite degree of heat, I shut off the burner 18 and regulate the flow of air and steam through the openings 12, so that a highly heated producer gas will be formed by the combination of the oxygen of the air and the steam with the coked material. Should the temperature fall below that required to produce the desired percentage of carbon monoxid, I reduce the flow of steam, and the combustion of the carbon to carbon dioxid at the lower temperature speedily raises the temperature of the cylinder to that point at which the producer gas containing principally carbon-monoxid and hydrogen (diluted with atmospheric nitrogen) is produced. Should the temperature increase to such an extent as to be undesirable, I increase the flow of steam.

The oxidation of the carbon to carbon-monoxid is more than sufficient to develop the degree of heat required for the production of the desired percentage of carbon-monoxid, and the introduction of the steam has, as is well known, a cooling effect on the gas generated in the vessel, so that by properly regulating the flow of air and steam I can decompose the carbon into a producer gas, carrying a suitable amount of sensible heat to distil completely the material entering into the vessel (where its distillation is not exothermic), and the products of distillation are then carried off by the outgoing producer gas, to be recovered from it in any well known manner, while the ash or waste drops down through the offtake 11 into the settling basin 19, from which it is readily removed.

Second. When it is desired to produce a tar-free gas, the apparatus is operated in the manner which I have specified above, except that the air to promote combustion is introduced through the openings 12 at the feed end 8, and the gas is withdrawn either from the outlet 17 or the offtake 11. If desired, steam can also be introduced with the air or separately, or in the form of water.

When the apparatus is operated in the manner first described, the gas is withdrawn through outlets 15 or 16; as the fuel travels through the apparatus it is gradually heated, the volatile matter is distilled, and this volatile distillate traveling through and out of the apparatus with the gas, passes through zones of gradually lowering temperature. At no point is it heated above the temperature of distillation, and consequently no chemical or physical change will be effected in the volatile until it leaves the apparatus and is cooled; then, only a physical change results, namely, condensation into tar or oil.

The tar-free gas, however, produced by the second method of operation, is rendered tar-free because the gas is withdrawn through the outlet 17 or offtake 11, in which case the volatile distillate passes through zones of gradually increasing temperatures and thus is distilled before it can reach the outlet 17 or offtake 11. This temperature is sufficient, when a proper amount of free oxygen is present, to effect a complete chemical change in the tars and oils, thus changing them chemically as well as physically into a fixed gas.

As in the first operation I have described, the carbonaceous material as it travels from the feed end 8 toward the discharge end 10, gradually rises in temperature; the volatile matter is distilled; and, air is introduced through the openings 12. When the temperature of combination is reached, the oxygen of the air unites with some of the constituents of the material. This develops heat, producing principally carbon dioxid ($CO_2$), but also forming other gases containing hydrogen or carbon and of varying composition, depending upon the relative quantities of combining elements and the temperature of combination. As these gases, carrying with them or meeting in their travel, the requisite amount of oxygen, are led toward the outlet 17 or offtake 11 in a highly heated condition, they react chemically with the shower of falling material through which they must pass in order to reach the said outlets, and in these reactions carbon dioxid unites with carbon, forming carbon monoxid, while some of the other gases are partially decomposed or "cracked", forming simpler hydrocarbon oxidizable gaseous compounds and hydrogen. The tar and other by-products resulting from the initial distillation of the material, where it enters the cylinder, and contained in the gas thereby liberated, are, by the heat of the aforesaid chemical reaction, raised to such a high temperature that they are converted into fixed gases. The combustible constituents of the finally resulting gas are principally carbon monoxid and hydrogen.

The oxidizing agent, in passing through the cylinder, is diffused throughout its cross-sectional area in a substantially uniform volume and the material, by reason of the construction and arrangement of the pockets, is also distributed uniformly, so that reactions will take place uniformly between the material and the oxidizing agent throughout the entire cross-sectional area of the cylinder, and a uniform heating is therefore generated through a vertical cross-sectional plane, taken at any given point in the length of the cylinder.

It is obvious that in my apparatus the heat necessary for distillation is obtained by contact directly with the various particles of the material rather than by conduction through a mass of material, so that distillation is readily effected at comparatively low applied temperatures, thus insuring an increased yield of by-products. The distillation is also the more readily effected by reason of the fact that as the finely divided material is dropped by the rotation of the vessel or as it is rolled or tumbled over the bottom of the vessel, the ash adhering to the surface of the particles is broken or rubbed off, and in consequence the particles are constantly presenting fresh surfaces to the heating gases until they are entirely converted into gas by-products and ash. It is also clear that by reason of the arrangement of the pockets for the material and their staggered relation, there is little or no possibility of the formation of "chimneys" or blow-holes between the showers of the material, as the material is kept constantly and uniformly in motion and in clinker form by a fusing ash, which agglomerants will form into comparatively small masses, like the "marbles" from Portland cement kilns, and will be automatically discharged without adhering to the interior of the cylinder, or without the necessity of manual breaking. The check rings 7 will also prevent such marbles from rolling down the incline of the bottom of the cylinder and from agglomerating with other similar masses.

In Figs. 3 and 4 I have shown a modified form of apparatus, in which the refractory lining of the casing 2' is comprised of the blocks 21 and 22, the blocks 22 being shaped so as to comprise buckets or lifting blades. In this form I have shown check rings 7' arranged at intervals throughout the casing, instead of between each set of buckets, so as to act not only as retarding means but to form various zones in the vessel. I have also shown in the discharge end of the vessel a baffle 23, which causes the gas, if the gas is being withdrawn from the discharge end of the vessel, to pass around and under the baffle prior to being led out of the stack 24, and thereby assists in throwing down the ash into the settling basin 19'. The check rings 7' divide the vessel into three different zones, A, B and C, which are heated to progressively increasing temperatures from the feed end to the discharge end. When it is desired to recover the by-products the gas is withdrawn through either the outlet 15' or the outlet 16', and it is obvious that the zone A, into which the material is fed, will be of lower temperature than the succeeding zones B and C, and that by-products will be carried off with the gas formed in zone A, and that in the zone B other by-products, released at a higher temperature, will also be carried off by the gas, but that, owing to the highly heated condition of the zone C, no by-products will be recovered therefrom, and any gas generated therein will be generated as a fixed gas. When it is desired to produce a fixed gas, the gas is withdrawn through the stack 24, in which case the by-products released in zones A and B will be carried through zone C, and will there be distilled, and the resulting product will be a fixed gas.

The apparatus which I have described is especially applicable for making producer gas from inferior grades of coal, from straw, chaff, garbage, sawdust, peat, tan bark and various other combustible forms of industrial waste, by reason of the high efficiency and uniform action obtained therein.

It is obvious that various modifications may be made in the apparatus which I have shown and described herein without departing from my invention.

What I claim is:

1. In apparatus for continuously making producer gas, a rotary vessel having an intake and offtake for the material and an outlet for the gas, a refractory lining in said vessel, said lining containing a plurality of sets of pockets, the pockets of each set being staggered with reference to the pockets of adjacent sets, and retarding rings arranged at intervals through the length of the casing and being adapted to retard the flow of the material therethrough, each set of pockets being adapted to shower the material clear across the cross section of the vessel in a series of showers out of longitudinal alinement with showers falling from adjacent sets.

2. In apparatus for continuously making producer gas, a rotary vessel having an intake and an offtake for the material and an outlet for the gas, a refractory lining in said vessel, said lining containing a plurality of lifting blades, said lifting blades comprising means for lifting the material and for showering it across the inner circumference of the vessel, each set of lifting blades being arranged in staggered relation with the adjacent set of lifting blades, and a plurality of retarding rings arranged at intervals throughout the length of the vessel.

3. In apparatus for continuously making producer gas, a rotary vessel having an intake and an offtake for the material, the vessel being equipped with a plurality of sets of lifting blades for lifting and showering the material across the cross section of the vessel, the lifting blades of each set being arranged out of longitudinal alinement with the blades of an adjacent set, outlets for the gas at opposite ends of the vessel, one of said outlets being arranged for removal of tar-free gas and another of said outlets being adapted for removal of gas and gaseous by-products, and means for reversing the direction of the gas to remove it through the said outlets.

4. In apparatus for continuously making producer gas, a rotary vessel having an intake and an offtake for the material, the vessel being equipped with means for maintaining the material in a finely comminuted and sub-divided condition in its travel through the vesel, means consisting of a plurality of sets of lifting blades on the inner periphery of the vessel, each set having its blades out of longitudinal alinement with the blades of adjacent sets, the sets being adapted to cause the material to fall in a series of succeeding showers out of longitudinal alinement with showers falling from adjacent sets, an outlet for gas at the same end of the vessel as the intake, adapted to be used for removal of gas and gaseous by-products, an outlet for gas at the same end of the vessel as the offtake, adapted to be used for the removal of fixed gas, and means for reversing the flow of gas to remove it through said outlets.

5. In apparatus for continuously making producer gas, a rotary vessel having an intake and an offtake for the material, sets of lifting blades arranged about the inner periphery of the vessel and forming a plurality of sets of pockets for successively and continuously elevating and showering the material down upon the bottom of the vessel, means for retarding the travel of the material and exposing it to heat, arranged at intervals throughout the length of the vessel, an outlet for the gas, and a baffle interposed in the outlet adapted to assist in the separation of the ash from the gas.

6. In apparatus for continuously making producer gas, a rotary vessel having an intake and an offtake for the material, sets of lifting blades arranged about the inner periphery of the vessel and forming a plurality of sets of pockets for successively and continuously elevating and showering the material down upon the bottom of the vessel, partitions dividing the interior of the vessel into a plurality of zones, and outlets for removal of the gas.

7. In apparatus for continuously making producer gas, a rotary vessel having an intake and an offtake for the material, sets of lifting blades arranged about the inner periphery of the vessel and forming a plurality of sets of pockets for successively and continuously elevating and showering the material down upon the bottom of the vessel, outlets for the gas, a starting burner for igniting the material, and openings into the vessel for the introduction thereinto of an oxygen-bearing agent.

8. In apparatus for continuously making producer gas, a rotary vessel having an intake and an offtake for the material and an outlet for the gas, a refractory lining in said vessel, said lining containing a plurality of sets of lifting blades, said lifting blades comprising means for lifting the material and for showering it across the inner circumference of the vessel, each set of lifting blades being arranged in staggered relation with an adjacent set of blades.

9. In apparatus for gasifying materials, a rotary vessel having an intake and an offtake for the material, a refractory lining for the vessel, means for admitting an oxygen-bearing agent into the interior of the vessel and other means for bringing the material repeatedly into contact with the oxygen-bearing agent, and means within the vessel for retarding the travel of the material.

JOHN W. HORNSEY.

Witnesses:
E. E. TEAGLE,
G. H. KINSEY.

Copies of this patent may be obtained for five cents each, by addressing the "Commissioner of Patents, Washington, D. C."